United States Patent [19]

Mackrle et al.

[11] Patent Number: 5,755,966
[45] Date of Patent: May 26, 1998

[54] METHOD AND APPARATUS FOR BIOLOGICAL ACTIVATION WASTE WATER TREATMENT

[76] Inventors: Svatopluk Mackrle, Pavlikova 5, 602 Brno, Czechoslovakia; Vladimir Mackrle, 1 Máje 12, 900 44 Tomásov, Slovakia

[21] Appl. No.: 501,054
[22] PCT Filed: Feb. 7, 1994
[86] PCT No.: PCT/CZ94/00005
§ 371 Date: Aug. 11, 1995
§ 102(e) Date: Aug. 11, 1995
[87] PCT Pub. No.: WO94/18130
PCT Pub. Date: Aug. 18, 1994

[30] Foreign Application Priority Data

Feb. 15, 1993 [CZ] Czech Rep. ............... 0202-93
Jan. 31, 1994 [CZ] Czech Rep. ............... 0200-94

[51] Int. Cl.⁶ .................... C02F 3/30; C02F 3/12
[52] U.S. Cl. .................. 210/629; 210/630; 210/194; 210/199; 210/207; 210/903
[58] Field of Search ................... 240/605, 629, 240/630, 903, 194, 196, 197, 199, 207, 208, 218–220, 221.1, 256, 261, 262

[56] References Cited

U.S. PATENT DOCUMENTS

| | | | |
|---|---|---|---|
| 4,054,524 | 10/1977 | Mackrle et al. | 210/195.1 |
| 4,139,457 | 2/1979 | Mackrle et al. | 210/194 |
| 4,260,486 | 4/1981 | Reid | 210/197 |
| 4,341,630 | 7/1982 | Mackrle et al. | 210/221.2 |
| 4,390,422 | 6/1983 | Mackrle et al. | 210/188 |
| 4,430,215 | 2/1984 | Mackrle et al. | 210/195.4 |
| 4,451,373 | 5/1984 | Thayer | 210/629 |
| 4,455,232 | 6/1984 | Reid | 210/629 |
| 4,460,471 | 7/1984 | Reid | 210/629 |
| 4,585,556 | 4/1986 | Mackrle et al. | 210/221.2 |
| 4,664,794 | 5/1987 | Mackrle et al. | 210/188 |
| 5,013,441 | 5/1991 | Gormszy | 210/605 |
| 5,032,276 | 7/1991 | Mackrle et al. | 210/629 |
| 5,041,217 | 8/1991 | Reid | 210/194 |
| 5,217,617 | 6/1993 | Duncan et al. | 210/194 |

FOREIGN PATENT DOCUMENTS

| | | |
|---|---|---|
| 1155976 | 10/1983 | Czechoslovakia . |
| 0367756 | 5/1990 | European Pat. Off. . |
| 2142008 | 1/1985 | United Kingdom . |

*Primary Examiner*—Thomas S. Wyse
*Attorney, Agent, or Firm*—Beveridge, DeGrandi, Weilacher & Young, LLP

[57] ABSTRACT

Biological activation waste water purification method is disclosed, wherein the waste water is biologically purified in an activation process. Activated sludge is pumped into a circulation circuit comprising a flow channel and at least one distribution channel. Raw waste water is added to the activated sludge to form an activation mixture which is gradually denitrified as it flows through the circulation circuit. The activation mixture is aerated so as to suspend the activated sludge in the mixture while gradually saturating the activation mixture with oxygen so as to change the denitrifying of the mixture to the nitrifying of a mixture as the mixture flows through the circulation circuit. The activation mixture then flows to a fluidized bed filter where it is separated into purified water and activated sludge. The apparatus for biological activation waste water purification comprises a tank with at least one basic module on the bottom of the tank and spaced from the walls of the tank and defining a flow channel about the module. The module has a pair of partition walls which define a pair of separation spaces with the side walls of the basic module and also define a distribution channel which communicates with the flow channel. The partitions also have at least one opening communicating with the separation space and the distribution channel. Aeration members are located in the tank between the basic module and the walls of the tank and between the pair of partitions.

35 Claims, 6 Drawing Sheets

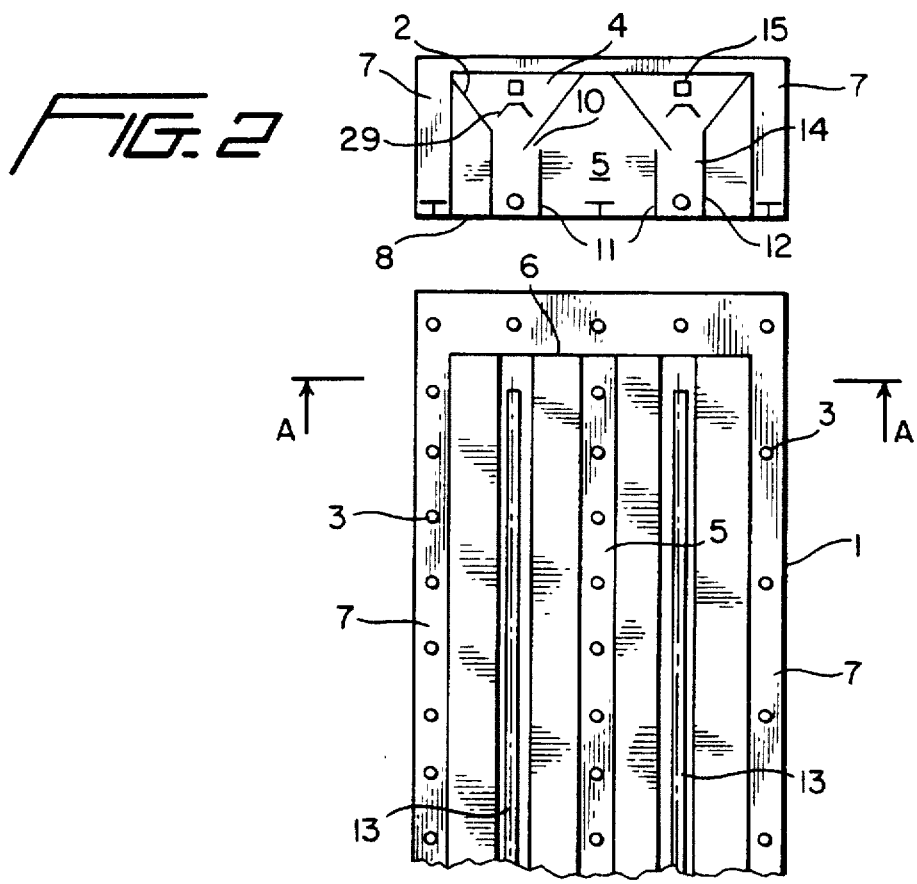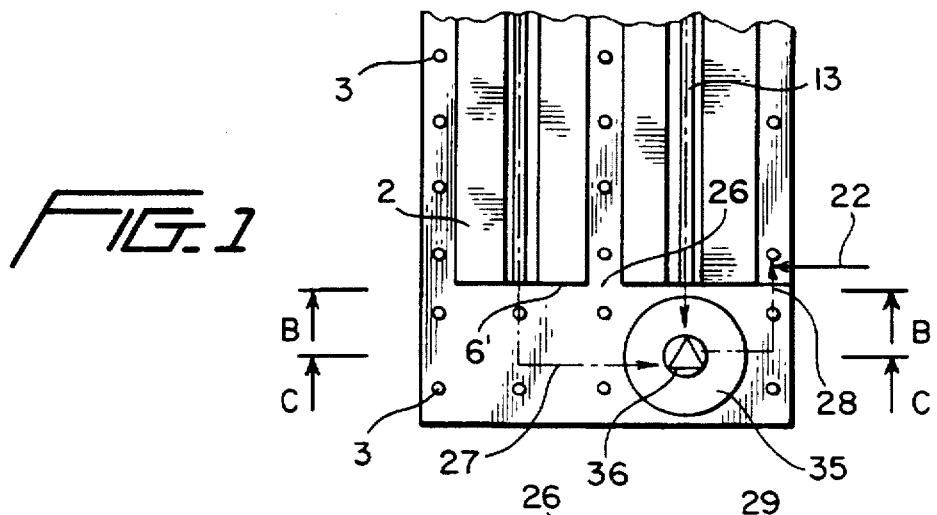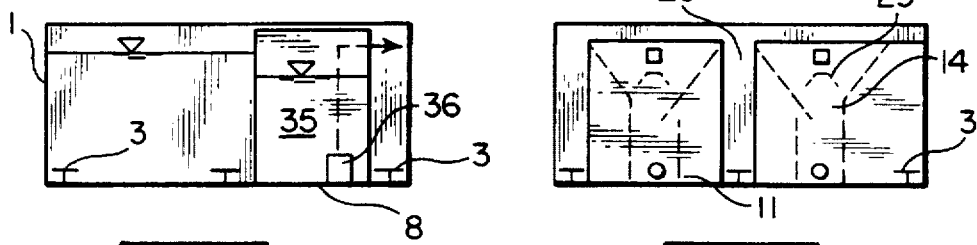

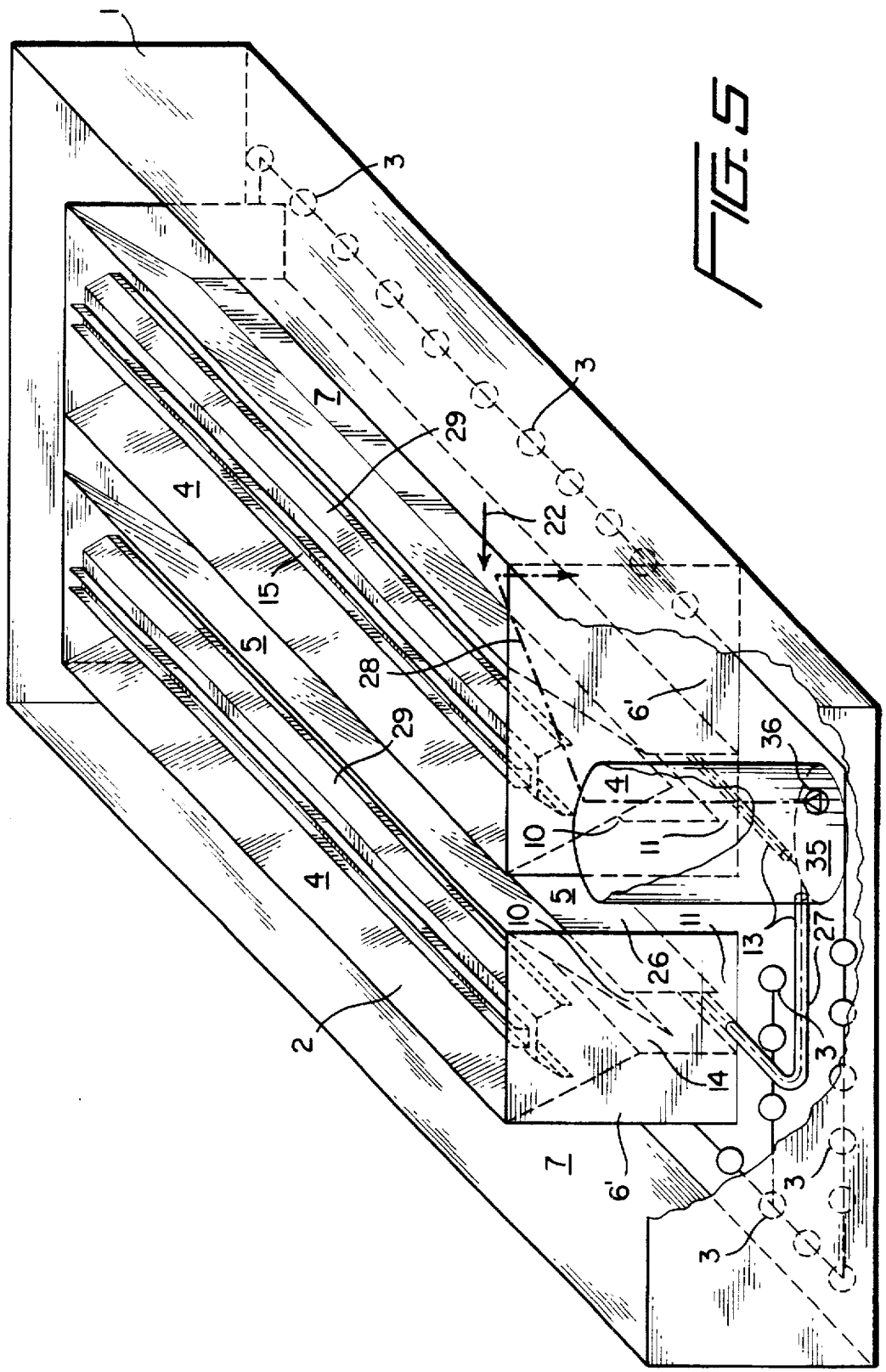

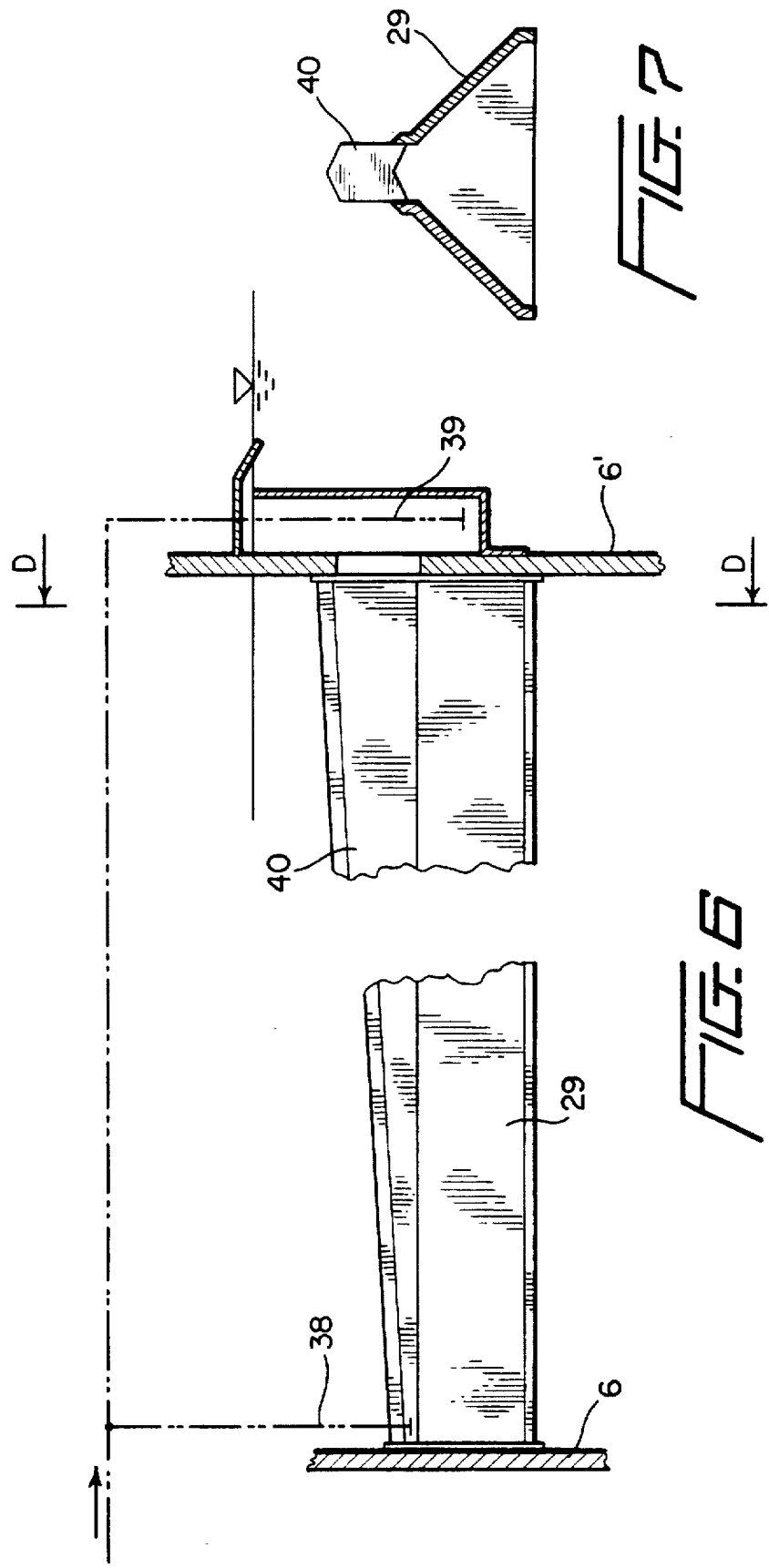

METHOD AND APPARATUS FOR BIOLOGICAL ACTIVATION WASTE WATER TREATMENT

The present invention relates to a method for biological activation waste water purification, wherein the waste water is purified in an activation process, during which a nitrification occurs. The present invention also relates to an apparatus for realizing said method, which comprises in a common tank an activation space and upwards extending longitudinal separation spaces, from which the outlets for purified water are led out, where each separation space is defined by the partitions and the faces and communicates with the activation space at one longitudinal side.

BACKGROUND OF THE INVENTION

An effective protection of the surface water, including seas, against eutrophication requires the utmost effectivity of removal of macrobiogen elements as nitrogen and phosphorus, the presence of which in the waste water is the main cause for the eutrophication phenomenon. That's why all systems for waste water purification have to consider this call for removing the nitrogen and phosphorus.

Hitherto known and used systems for waste water purification with simultaneous reduction of the nitrogen content are orientated to biological processes, which seem to be the most economical ones. All said processes require first a conversion of the oxidable nitrogen forms, i.e. the ammoniacal and organic nitrogen, through the nitrification processes to the nitrate form. Then the nitrate reduction through the denitrification processes to the gaseous nitrogen follows.

The nitrification requires a presence of the nitrification bacteria in the activated sludge, which requires a sufficient sludge age, practically the entire nitrification being attained at the sludge age of 30 days, which corresponds to the sludge load 0.12 kg of biological oxygen demand in five days per one kilogramme of volatile suspended solids of the activated sludge multiplied by the number of the days, further called as kg $BOD_5$/kg VSS.d In addition, the nitrification processes require a sufficient concentration of the dissolved oxygen, as a rule over two milligram of the oxygen per one liter of the liquid—further called as 2 mg $O_2$/l. The following denitrification is then in progress while there is a shortage of dissolved oxygen in the liquid, whereby the microorganisms get the necessary oxygen through nitrate reduction.

The prior art knows three essential alternatives for the solution of the system for complex biological water purification with a simultaneous nitrification and denitrification.

The first alternative is an intermittent denitrification. In this solution the nitrification and denitrification phases of the activation purification periodically alternate through an intermittent aerating. The disadvantage of this solution is a reduced effectiveness of the intermittent process compared with the continual one, complicated regulation of the process and also ceasing of the suspension of the activated sludge during the aerating interruption.

Another alternative is a preceding denitrification. In this solution is a separated denitrification in the form of a perfectly mixed tank with an intense mixing supply realized before the aerated activation. During the preceding denitrification process the waste water is carried out together with the activation mixture recirculated from the aerated activation. The disadvantage of the preceding denitrification is the necessity to create a separated denitrification activation space with an independent source of movement of the activation mixture in order to secure an activated sludge suspendation.

A necessary volume of denitrification activation depends on waste water quality and process parameters and therefore it changes itself with respect to time and locality. In order to secure purification in a good quality the fixed volume has to have the size sufficient for an extreme case and therefore is usually overdimensioned.

Another disadvantage is that a part of the surface of the denitrification space is not utilized for the activated sludge separation, the not utilized part being up to 25% of the surface in a reactor in a municipal waste water treatment plant.

An example of solution with separated denitrification space and separated aerated activation space represents e.g. patent specifications CA - A 1 155 976 and EP - A 0 367 756. In the first mentioned patent specification an embodiment is disclosed where a single centrally located anoxide zone and two aerobic zones are designed, located at the two end sides of reaction tank, each aerobic zone being divided by solid wall partition means into a downflow aeration zone and an upflow fluidized bed zone. This solution has the disadvantages of fixed functional volumes mentioned above.

In the second mentioned patent specification an inner denitrification space and outer nitrification space are disclosed and the solution is directed to regulation of circulation flow by means of changing the cross section of passage between those spaces. The disadvantages of the fixed functional volumes are there inherent, too.

The third known alternative of denitrification during the biological water purification is a denitrification in a circulation circuit of a type with oxidization ditches and carousel systems. In this case the functions of aeration and mixing of the waste water with the activation mixture are fused with supplying the movement of the activation mixture in the purifying system, in one system in the form of a mechanic aerator. With a flow of the activation mixture through the circulation circuit saturation of the activation mixture with the dissolved oxygen occurs, through that a nitrification occurs and through a gradual consumption of the oxygen by the oxidation processes of the biodegradation and nitrification the oxygen content in the activation mixture is decreasing, so that at the end of the circulation circuit the denitrification process is performed with an oxygen lack.

Said technical solution of the denitrification shows many disadvantages. Mechanical aeration needs flat, not deep tanks, which need a large construction place. The surface of the tank is not used for separation of the activated sludge, the consequence of which is the requirement of completing of the activation apparatus by an independent separation equipment, which further increases the construction place size necessary and therefore the investment costs. Sideline independent separation with a forced recirculation through the separated sludge settling is not very effective and causes a low operating concentration in the activation part. The need of a low loading of the activated sludge with the sludge age of 30 days results in large volumes of the activation space.

A considerable disadvantage of the circulation circuits is also a high sludge index in the activated sludge resulting from an insufficient releasing of the gaseous nitrogen bubbles sticking to activated sludge particles during the the denitrification, which results in a significant lowering of the apparatus capacity.

Another disadvantage of the fusing of three functions, i.e. aeration, supplying of movement of the activation mixture and mixing the waste water with the activation mixture, is that said fusing causes lowering of the denitrification effectiveness in the waste water with a higher content of the nitrogen pollution, which results from a lack of a carbon supply needed for denitrification processes in the denitrification part. To provide a sufficiently effective nitrification and denitrification it is therefore necessary to combine said apparatus with an intermittent aeration of the activation mixture with all the negative effects on the intermittent process.

The above mentioned known solutions of the denitrification show disadvantages for both new waste water purification plant construction and reconstruction of existing classical waste water purification plants, which no more respond to the increased demands for a purified water quality considering the eutrophication elements. There is a lot of municipal waste water purification plants built in the fully developed industrial countries which already need to be intensified or reconstructed. Hitherto existing solutions of denitrification are not suitable for it, because they call for either a new waste water purification plant construction or at least considerable building rearrangements in the classical municipal waste water purification plants. That's why an urgent need to create a solution enabling the use of the hitherto existing municipal waste water purification plants, which would at the same time fulfill the contemporary ecological demands, has arisen.

The object of present invention is to eliminate as much of the disadvantages of the known solutions as possible and to create a new method and apparatus realizing an essential intensification of biological activation waste water purification also with a possibility to use already existing classical waste water purification plants.

SUMMARY OF THE INVENTION

The subject matter of the method according to the invention is that the activation mixture is brought into circulation in a circulation circuit, at least a part of the circulation circuit intended for denitrification and nitrification having a plug flow character and being formed by sequentionally ordered longitudinal flow channels provided by pneumatic aeration by means of aeration elements, at the end of the part having the plug flow character the purified water is taken away by a fluidized bed filtration and sludge separated by the fluidized bed filtration mixed with the activation mixture in form of a concentrated activation mixture is taken by forced flow means into the beginning of the first flow channel, into the same place at the beginning of the first flow channel raw waste water being brought.

Considering the effectiveness of the waste water purification it is a contribution that in the same time period the quantity of the purified water which is being taken away from circulation circuit through the fluidized bed filtration is smaller than the quantity of the activation mixture circulating in the circulation circuit.

It is advantageous that the activation mixture mixed with the raw waste water is oxidized gradually through the aeration with a simultaneous suspendation of the activated sludge until the concentration of the dissolved oxygen in the activation mixture is at least two milligrams of oxygen per one liter of the activated mixture.

Considering the control over the waste water purification process it is essential that the aeration is executed by a pneumatic aeration with a varying intensity as a function of the time and/or place in the circulation circuit.

To reach a needed effect of the activation it is essential that the circulation intensity of the activation mixture is at least the double of the purified water throughput.

Considering the bringing of the activation mixture in the plug flow it is a contribution that the activation mixture is brought into the circulation circuit by the raw waste water admission, by draining off the purified water and by forced admission of the activation mixture thickened by the separation into the circulation circuit behind the separation process.

To increase the effectiveness of the denitrification it is significant that the purified water is taken away during each circulation by fluidized bed filtration from oxid part of the circulating activation mixture.

The subject-matter of the apparatus according to the invention is that always two separation spaces are arranged adjacent to each other by their longitudinal sides, in which communicative connections with the activation space are formed and the longitudinal distribution channel 5, formed between the said longitudinal walls is completely closed by an end wall at one side, while at the opposite side a passage is arranged, by means of which it is connected with the flow channels system, the channels being laterally parted from the separation space, and the flow channel system and at least one distribution channel 5 form a part of the circulation circuit, another part of the circulation circuit being formed by a collecting equipment connected to the outlet for the activation mixture from the separation space, said collecting equipment being connected to at least one pumping set, the mouth of which forms the beginning of the circulation circuit, while the raw water admission mouths either into the admission area of the pumping set or into its mouth area, and the circulation circuit is provided with at least one baffle plate.

To keep the sludge at a sufficient age and the circulation intensity in the circulation circuit it is advantageous that the collecting equipment is arranged near to the bottom of the separation space for fluidized bed filtration, the communicative connection with the activation space being formed by the upper opening and the lower opening, both of which are located at the same side of the separation space, the upper opening is connected with the extension of the separation space and the lower opening is near to its bottom, while the upper opening is smaller than the lower opening, so that it forms a resistance against the streaming of the activation mixture.

Considering the hydraulic relations in the reactor and the simplicity of the construction of the separation space it is substantial that the separation space is connected with the activation space through a passage formed by a break in the partition of the separation space at the tank bottom, while a collecting main with inlets for thickened activation mixture is arranged in the separation space near to the tank bottom, the collecting main being connected with a pump, the outlet of which mouths in the activation space.

Considering the construction and reconstruction of waste water purification plants it is essential the circulation circuit is formed by at least one basic module, in which the distribution channel 5 is formed by two inner partitions and the outer partitions form always together with the inner partition a separation space and together with the circumferential wall of the tank or with the outer wall of the next module a circumferential flow channel, while the distribution channel 5 is at its front connected with the circumferential flow channel and at its side with the separation space.

Considering the effectiveness of the biological purification it is essential that the collecting sump, provided with a pump, is arranged in the circulation circuit, while outputs of the collecting equipment, bringing the activation mixture, mouth in said sump, and the outlet from the pump mouths behind the baffle plate at the beginning of the flow channel, the raw water admission mouthing in the collecting sump.

To provide a unified system for inner structure of reactors it is advantageous that additive modules of an identical embodiment are adjoined in the perpendicular direction to the basic module, eventually the basic module is arranged with its axis going through the center of the tank and the additive modules are arranged symmetrically and perpendicularly to the basic module. It is also an advantageous embodiment wherein at least one additive module is parallel adjoined to the basic module, the system of parallel modules formed in this way being symmetrical to the axis going through the center of the tank.

To maintain a link-up of the separate processes of the waste water purification it is essential that the aeration elements are in the admission area for the raw waste water arranged with farther spacing than in the next parts of the circulation circuit, the cross sectional area of flow of the inlet opening into the fluidized bed filter being larger than 10% of the surface area in the separation space.

An improvement of the denitrification course is reached by providing the collecting equipment with at least one pump, preferably centrifugal pump, which is arranged in the collecting sump.

Considering the construction of big municipal waste water purification plants it is a contribution that the separation space for fluidized bed filtration is arranged through the whole length of the distribution channels of the circulation circuit, while the inlet of activation mixture into the separation space for fluidized bed filtration and the collecting equipment for carrying the thickened activation mixture out from the separation space are formed through its whole length.

For the effective removal of floated sludge is good that a trap for flotated sludge is arranged in the upper part of the separation space, said trap being formed by a sloping roof, to the lower side of which a pressure air supply is adjoined, the upper part being provided with a flotated sludge outlet in the form of an air-lift pump mouthing in the activation space, while the whole roof is under the tank surface area.

For preventing the influence of the flow in the distribution channel 5 onto the flow pattern in the separation space it is important that at least one flow deflector is arranged in the area of the passage to the partition from the side of the activation space.

Considering the intensity of the nitrification it is advantageous that a mixer is arranged at the beginning of the activation space and the outlet from the pump mouths in the mixer, in which admission for raw waste water mouths and the outlet from the mixer mouths in the following part of the activation space.

Due to the possibility of cleaning the collecting pipes it is important that the pump aggregate is a pump provided with a submersible reversible electric motor.

For the possibility of taking off the electric motor and the runner of the pump aggregate it is advantageous that the reversible electric motor and the runner of the pump are arranged slidingly on guiding bars, located vertically to the tank bottom.

Considering the keeping an optimal length of the collecting pipes it is important that the pump is connected with at least two branches of the collecting main.

To enable an interrupted or controlled supply of the air it is important that the aeration hoses are located in the activation space and are connected with the pressure air supply through a closing or through a regulator.

For better use of the air oxygen it is important that the aeration hoses are arranged in two branches which are located mutually at the opposite sides of the cross-section of the circumferential channel.

The method and apparatus according to the invention represent a very effective means for prevention the eutrophication in the water supplies in the nature. The main advantage is a high effectiveness of the purification for both removal of the the organic substances from the waste water and reducing the content of the eutrophication elements, i.e. nitrogen and phosphorus. A complex waste water purification, especially municipal waste water purification is hereby provided by a simple method for activation purification without the necessity to add additional procedures for denitrification and dephosphatisation. This significantly simplifies the technical solution of the reactors for a complex biological waste water purification.

The module system of the reactor according to the invention allows a modular construction of the reactors in a wide range of capacity, up to the biggest reactors suitable for conurbations with millions of inhabitants. With channels formed by insertion the separation spaces for fluidized bed filtration into the activation space, the system of channels conection into a uniform circulation circuit allows a maximum simplifying and at the same time a shortening of the connecting ways between the linking up processes of the activation purification, including separation of the activated sludge with a minimum hydraulic resistance in the system. The system of activation mixture circulation allows also a spot inlet for raw water into the reactor, which lowers the cost of the raw waste water distribution in the waste water purification plant.

Another advantage of the method and apparatus according to the invention is a high capacity resulting from a maximum use of the surface area of reactor for separation, allowing the reactor working with a high activated sludge concentration, which causes an increased qualitative and quantitative parameters of the apparatus.

The method and apparatus according to the invention allow also a reconstruction of the hitherto existing classical waste water purification plants, which means an essential cost reduction compared with a construction of new waste water purification plants or an extension of old waste water purification plants.

BRIEF DESCRIPTION OF THE DRAWINGS

The invention will now be described in more detail with reference to exemplifying embodiments thereof, illustrated in the accompanying drawings, in which FIG. 1 is a ground view at the basic module of the circulation circuit of the activation mixture;

FIG. 2 is a vertical section through the module along the line A—A in FIG. 1;

FIG. 3 is a vertical section along the line B—B in FIG. 1;

FIG. 4 a vertical section along the line C—C in FIG. 1;

FIG. 5 is a axonometric view at the basic module of the circulation circuit according to FIG. 1 to 4;

FIG. 6 is a front view at the flotated sludge trap;

FIG. 7 is a sectional view along the line D—D in FIG. 6;

DETAILED DESCRIPTION OF EXAMPLES OF EMBODIMENT

Figure 9:
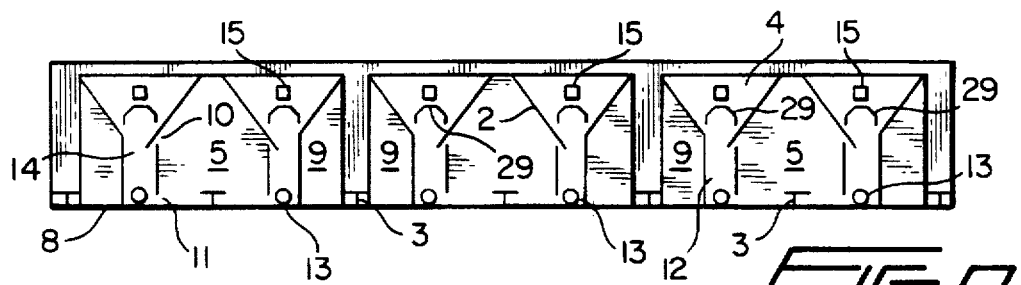
FIG. 9 is a vertical section through the reactor along the line A—A in FIG. 8.
Figure 10:
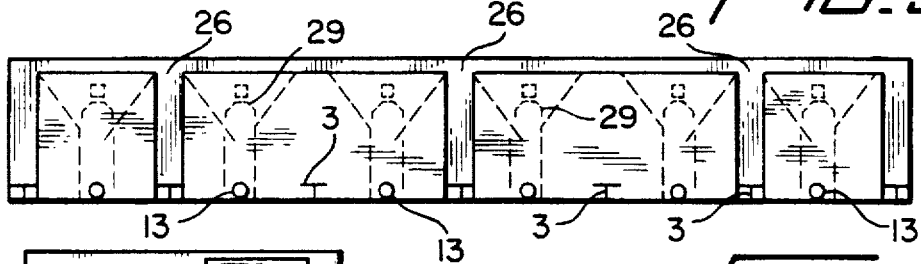
FIG. 10 is a vertical section along the line B—B in FIG. 8.
Figure 11:
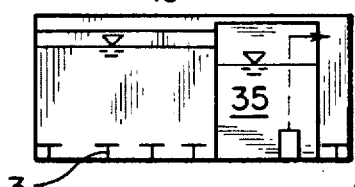
FIG. 11 is a vertical section along the line C—C in FIG. 8.

The apparatus according to the present invention comprises at least one circulation circuit. Each circulation circuit includes at least one basic module. In case the apparatus includes more modules or eventually one basic module and other additional modules, the embodiments of the basic module and the additional modules are preferably identical.

In the embodiment of the basic module of the circulation circuit according to FIGS. 1 to 4 is the volume of a rectangular tank with the circumferential walls 1, e.g. concrete walls, and with the bottom 8 divided by a system of inserted partitions 2 into functional spaces, i.e. spaces for both biological activation waste water purification processes and for flocculent suspension separation by a fluidized bed filter.

In a preferred embodiment of the basic module, the adjacent inner partitions 2 delimitate the separation spaces 4, which create the fluidized bed filter, each of them having a circumferential flow channel 7 passing along one of its sides and a distribution channel 5 along the other side, which ends up in the face 6, which completely closes the separation space 4 for fluidized bed filtration and the distribution channel 5. There are two separation spaces 4 abutting on each other by their longitudinal sides in the basic module, wherein the distribution channel 5 is formed between them. Separation spaces 4 spread essentially through the whole length of the basic module and communicate essentially through the whole length with the distribution channel 5. The circumferential flow channels 7 are located between the outer partitions 2 and the circumferential walls 1 of the tank and they are separated from the separation spaces 4 along their sides. The trap 29 for flotated sludge and the collecting flumes 15 for collecting the purified water are located in the upper part of the separation spaces 4 for fluidized bed filtration.

The separation space 4 for fluidized bed filtration is completely closed by the face wall 6' at the opposite end, while the distribution channel 5 communicates with the circumferential flow channel 7 through the passage 26. The passage 26 has a rectangular shape, the longer side thereof being vertical (FIG. 3). This embodiment is easy to produce and is functionally satisfying. But the passage 26 may also have a different shape, e.g. the shape referring to the cross section of the distribution channel 5 in order to achieve a minimum hydraulic resistance.

There may be also formed a not shown module comprising only one separation space 4. In that case the circumferential flow channel 7 is formed along a longer side and a shorter side of the separation space 4 while the distribution channel 5 is formed along the other longer side. By arranging two of these not shown modules side by side the above mentioned basic module with two separation spaces 4 results.

The flotated sludge trap 29 (FIG. 6.7) is immersed under the surface. It comprises a sloping roof with the head 40 (FIG. 7). The essential part of the roof is horizontal, while the head 40 connected with the essential part or forming a single unit with it is inclined, its cross section thus gradually altering. The head 40 is at a relatively small angle with the horizontal plane. The lower ending of the trap 29 is connected through the admission 38 with a not shown separate pressure air supply with an overpressure corresponding to a comparatively small immersion depth, that means that the trap 29 is aerated. At the opposite—higher ending of the trap 29 an outlet for flotated sludge is located, the main part of which is the air-lift pump 39, preferably connected with the same pressure air supply as the admission 38. The air-lift pump 39 may also be connected with another separate pressure air supply (not shown). The terminal of the air-lift pump 39 is led out at optional place at the flow channels 7,9. Sludge withdrawal may be continuous or intermittent, i.e. the pressure air supply, eventually pressure air supplies may be active permanently or intermittently essentially in dependence on the flotation rate. The present invention may be used also without the trap 29, e.g. in a case where no increased sludge flotation in the separation occurs.

The partitions 2 are angular in the upper part of the separation space 4 (FIG. 2,3,9,10). The lower part 12 of the separation space 4 is linked to the upper part, the partitions 2 in the lower part 12 being preferably straight and parallel to each other. There is the upper opening 10 formed in the upper part of each separation space 4 and the lower opening 11 in the lower part 12. Both openings 10, 11 form a communication connection from the distribution channel 5 to the separation space 4 and they are both at the same side of the separation space 4. The upper opening 10 is linked to the extension of the separation space 4 and forms thus at the same time the inlet for activation mixture into the separation space 4. Said upper opening 10 is as a rule provided by a smaller inlet cross section than the lower opening 11, the upper opening 10 causing an additional resistance for the activation mixture streaming from the distribution channel 5 into the separation space 4 (FIG. 2,3). The upper opening 10 forms preferably a slot spreading through the whole length of the separation space 4, eventually an intermittent slot or separate, uniformly located slot openings. The axis of the lower parts 12 of the separation spaces 4 is preferably vertical, but it may be also oblique, so that the lower part 12 of the separation space 4 is deviated from the distribution channel 5. The lower opening 11 is arranged near to the bottom of the separation space 4, it is realized as openings in the wall of the lower part 12 of the separation space 4 and its total cross-section is larger than total cross-section of the upper opening 10 up to its multiple. The lower opening 11 is intended particularly for drawing the activation mixture into the lower part 12 of the separation space 4, for equalizing the levels in the separation space 4 and in the activation space and also for sludge removal when the operation is interrupted.

The size of the inlet opening 14 into the fluidized bed filter is in the big municipal waste water purification plants—with a low hydraulic unevenness factor up to 1.5 —at least 10% of the separation surface.

The outlet for the thickened activation mixture from the separation is connected to at least one collecting equipment with at least one pumping set. According to a preferred embodiment the collecting mains 13 of the collecting equipment are located near to the bottom of the lower parts 12, the collecting mains being connected with collecting sump 35, wherein at least one pump, preferably a centrifugal pump 36, is located, and this pump is also a source of local turbulence. Outlet 27 of the pump 36 is directed to the circumferential flow channel 7 behind the baffle plate 28 as viewed in the direction of the activation mixture flow (FIG. 1). Baffle plate 28 closes the head of the circumferential flow channel 7, either completely, which is a preferred embodiment, or at least partly. It is essential that the outlet 27 together with the admission 22 for the raw sludge mouths in the circulation circuit in the flow direction behind the separation spaces 4. So the raw water admission 22 may mouth either in the inflow area of the pumping set or in the outlet area of the pumping set behind the baffle plate 28. The raw water admission 22 is preferably directed in the collecting sump 35 (not shown in FIG. 1).

The distribution channel 5 communicates through the upper opening 10 with the separation spaces 4 and through the lower opening 11 with the collecting main 13 (FIG. 1,8), wherein at least one pump is included as a pumping set, e.g. an air-lift pump (not shown) or more air-lift pumps (not shown), eventually the said centrifugal pump 36 located in the collecting sump 35 (FIG. 1,8,11), as mentioned above. If the centrifugal pump 36 located in the collecting sump 35 is put into practice, no air-lift pump is used, eventually the air-lift pump is included in some of the branches of the collecting main 13 only in order to increase the mixing effect in the thickened activation mixture leaving the outlet 27 and falling in the activation mixture in the tank, eventually into the collecting sump 35. The air-lift pump—or the centrifugal pump 36, if the collecting sump 35 is included—mouths with its outlet 27 into the circumferential flow channel 7 behind the baffle plate 28 (FIG. 1). The centrifugal pump 36 may also be replaced by the air-lift pump. Both kinds of pumps may be located either in the collecting sump 35 or outside the collecting sump 35, in every case the pump is a part of the outlet from the collecting sump 35, adjoining thus the collecting sump 35.

Through this mutual connection between the circumferential flow channel 7, distribution channel 5, separation spaces 4 and by means of the collecting main 13 of the collecting equipment and the collecting sump 35 through back connection through outlet 27 with the circumferential flow channel 7, a circulation circuit for the activation mixture is formed, wherein the activation mixture flows in a plug flow. The circumferential flow channel 7 is over the whole length completely separated from the separation spaces 4 by the partition 2.

The aeration elements 3 are placed near to the bottom in the circumferential flow channel 7 and in the distribution channel 5, preferably with various spacings so that different sections of the circulation circuit have different aeration intensity. According to the preferred embodiment the aeration elements 3 are in the raw sludge admission area located so that they are spaced farther from each other than in the next parts of the circulation circuit.

It is also possible to locate the aeration elements 3 with equal spacings but with different aeration intensity at different places of the circulation circuit, the inventive apparatus may be thus adapted to different conditions. It is also possible to use aeration elements with a time variable aeration intensity.

The above mentioned baffle plate 28 is located in the circumferential flow channel 7 at the face wall 6' side with the passage 26 into the distribution channel 5. There is a raw water admission 22 leading behind the said plate 28 together with the outlet 27 of the air-lift pump or air-lift pumps (not shown), eventually the centrifugal pump 36. The circumferential flow channel 7 has got in its longitudinal parts along the separation spaces 4 a form of a narrow corridor, its cross section being formed by the shape of the separation space 4. As a rule the circumferential flow channel 7 extends downwards first (FIG. 2) and in the lower part its walls are vertical and parallel. If using a different form of the separation space 4, the walls of the circumferential flow channel 7 may be e.g. angular and parallel, eventually angular and divergent.

The operation of the described basic module of the circulation circuit and the method for biological activation waste water purification with a dynamic nitrification and denitrification is as follows:

The activation mixture circulates in the circulation circuit by a plug flow and it is continuously oxidized by a pneumatic aeration, which at the same time secures a suspendation of the activated sludge. So all individual particles of the activation mixture advance in the circulation circuit with at least one vector component of its speed in the direction of the activation mixture flow as a whole in the circulation circuit. It is thus advantageous that through the operation of the aeration elements 3 the individual particles move also in the level perpendicular to the advance in the circulation circuit and perform e.g. a helicoid movement. To reach a high activated sludge concentration in the circulation circuit, the activation mixture is object of fluidized bed filtration in course of every circulation, during which the purified water is separated from the mixture, while the separation is performed in the separation spaces 4, which cover practically the whole surface of the tank with the circumferential walls 1. Purified water separated through fluidized bed filtration is taken away by collecting flumes 15 and its quantity is always lesser than quantity of the activation mixture circulating in the circulation circuit during the same time period. It is advantageous that the purified water is taken away by the fluidized bed filtration from a part of the circulating activation mixture only, what enables to reach a high circulation intensity and herewith high denitrification degree is possible. This is achieved according to the exemplifying embodiment by drawing the activation mixture from the distribution channel 5 through the lower opening 11 in the collecting equipment area near to the bottom of the separation space 4.

The circulation is performed by raw waste water admission, by pumping the thickened activation mixture from the fluidized bed filter back into the circulation circuit behind the baffle plate 28 and by purified water outlet through the collecting flumes 15. The activation mixture is herewith brought in the circulation circuit with a plug flow character. Raw waste water is admixed into the circulation circuit, preferably behind the baffle plate 28 or in the collecting sump 35. That causes an oxygen lack at the surface of the particles of the activated sludge, and it starts denitrification processes. The activation mixture is then by effects of the aeration elements 3 gradually oxidized by aeration with simultaneous suspension of the activated sludge during the circulation in the flow channels 7 till the conditions necessary for nitrification processes are reached, and then the activation mixture is subjected to a fluidized bed filtration in the separation spaces 4. Raw waste water is admixed into the thickened activation mixture with nitrate originated through the oxidation of the nitrogen pollution, e.g. in the collecting sump 35, and herewith all processes of the complex waste water purification with organic and nitrogen substances removal are realized during one circulation. As a rule the activation mixture is gradually oxidized through the aeration until the concentration of the oxygen dissolved in the activation mixture reaches or exceeds at least two milligrams of oxygen per one liter of the activation mixture. Herewith an optimum process of biological waste water purification is realized, as it will now be below described in more detail.

The activation mixture enters the separation spaces 4 for fluidized bed filtration through the upper opening 10 and the extending space of the separation space 4, and it is brought through the inlet opening 14 from the lower part 12 into the fluid-extending part of the separation space 4, wherein the fluidized bed filtration is realized. The effectiveness of the separation through the fluidized bed filtration depends among others on the size of the inlet opening 14. The optimum size of the inlet opening 14 is at least 10% of the separation surface in big municipal waste water purification plants with a low hydraulic unevenness coefficient up to 1.5. The separation of purified water from the activated sludge is performed in the fluidized bed filter in the separation space 4 by fluidized bed filtration, wherein the water deprived of the activated sludge suspension is led away through collecting flumes 15 from the purification system. The flotated sludge intercepted on the trap 29 is brought into the activation space, as a rule at an arbitrary place in one of the flow channels 7,9. Through filtration thickened activated sludge sinks countercurrent-wise through the inlet opening 14 into the lower part 12 to the collecting main 13 arranged near to the bottom of the lower part 12. The outlet 27 of the collecting equipment, eventually in absence of a pump, the collecting main(s) 13 itself mouths in the collecting sump 35, wherefrom the activation mixture is pumped off by a centrifugal pump 36, this pump causing a strong local turbulence.

The local turbulence excited by the centrifugal pump 36 is necessary to release gaseous nitrogen bubbles which stuck at the particles of the activated sludge during the denitrification process. The flowing of the activation mixture in the collecting sump 35 is of a gravitational type owing to a difference between the level in the tank and in the collecting sump 35. If the local conditions call for it, it is also possible to place a pump in the collecting equipment, e.g. an air-lift pump.

The lower opening 11 allows also in case of an interruption in the reactor aeration a passage of the activated sludge from the separation space 4 into the distribution channel 5, and herewith an undesirable silting with sludge in the lower part 12 is prevented. The lower opening 11 secures at the same time a level equalizing in separation and activation during the filling of the reactor or during the sludge blow-off, and this allows a pressureless solution of inner structure of reactor.

Raw waste water is admixed in the circulation circuit in the circumferential flow channel 7 into the activation mixture thickened after the fluidized bed filtration, said waste water causing a shock drop of the dissolved oxygen concentration in the activation mixture especially at the surface of the particles of the activated sludge, and herewith it provides good conditions for dynamic denitrification. The denitrification processes nevertheless don't require anoxid conditions in the whole volume of the activation mixture, formation of local anoxid conditions at the surface, eventually at the surface of the activated sludge particles is entirely sufficient. The shape of the circumferential flow channel in the form of a narrow corridor makes it possible that also a little aeration intensity is sufficient for a suspendation of the activated sludge during a considerable flowing speed of the activation mixture. The denitrification regime needing a low oxygen content in the activation mixture is not impaired by that.

At the running aeration during the plug flow it comes to a biodegradation of the polluting substances in the activation mixture through oxidation and a gradual saturation of the activation mixture with oxygen up to the reaching of conditions for nitrogen substances nitrification, what is usually achieved through a value over 2 mg $O_2$/l. An increased content of the dissolved oxygen is favorably shown also in the effectiveness of the following activated sludge separation through the fluidized bed filtration, because a higher oxygen content in the activation mixture prevents denitrification processes during the fluidized bed filtration. It prevents the flotation of the activated sludge in the separation space 4 and also the releasing of the phosphorus into the purified water.

The circulating activation mixture brings nitrates, originated in the nitrification zone with sufficient oxygen content, into the circulation circuit zone with a lowered dissolved oxygen content. Then the nitrates are reduced to a gaseous nitrogen in said zone with a lowered oxygen content, and so the denitrification is performed. Bubbles of the gaseous nitrogen which stick at the activated sludge particles during the denitrification are removed with the circulation of the activation mixture in the circulation circuit by a movement supply with a high local turbulence intensity, e.g. by a centrifugal pump 36. The streaming power for calling intensive local turbulences may be advantageously used for admixing the circulating activation mixture with the purified waste water, wherein the raw waste water admixed into the circulating activation mixture causes besides a lowering the content of dissolved oxygen, also carbon supply necessary for denitrification processes.

The effectiveness of the described dynamic waste water denitrification in the circulation cycle of the activation mixture with periodical alternation of the nitrification and denitrification process depends on the circulation intensity of the activation mixture according to the expression $$\tau [\%] = \frac{1}{n+1} \times 100,$$

wherein $\tau$ is the effectiveness of the denitrification given in percents n is the proportion of the water quantity running through one cross section in the circulation circuit in a time unit to the raw water quantity being brought in the same time unit.

This proportion represents a circulation intensity in the circulation circuit. E.g. to reach a 75% effectiveness of the nitrates reduction according to the above mentioned expression a triple circulation intensity compared with the purified raw water quantity is necessary. Described process of biological waste water purification is usually effective with an intensity of the activation mixture circulation being within the range of double up to sextuple of the purified water quantity. The circulation intensity may be also much higher for very concentrated waste water and therefore the quantity of the water running through the circulation circuit may be a multiple of the raw waste water being brought. Then it is also necessary that the sucking of the activation mixture through lower opening to the collecting equipment inlet is higher. That is given by the dropping resistance value, i.e. by the size of the upper opening 10.

The total intensity of the biological purification processes depends on the concentration of the activated sludge in the purification system, which is directly dependent on the separation intensity. The circulation of the activation mixture in the circulation circuit necessary to reach the required denitrification intensity increases the claims for separation capacity.

An integral insertion of the fluidized bed filtration in the circulation circuit of the activation mixture, with a full use of the whole activation surface for separation, secures a high concentration of the activated sludge, which secures then a low sludge loading necessary for the nitrification as the main objective for nitrogen pollution removal from waste water. An important quality of the described method of dynamic nitrification and denitrification is also its high effectiveness of phosphates removal from waste water, that with a total reduction of phosphorus up to 80%.

According to the described method all processes of complex biological purification with a removal of organic and nitrogen substances and also with a high effectiveness of phosphates removal from waste water are accomplished in one circulation in the circulation circuit.

Example of the Method No. 1

The described method according to the invention performed in a communal waste water purification plant of a mountains recreation center, and before all documentation of results of this method is in question. For the waste water purification plant a seasonal load is characteristic with maximum values in winter and summer. The top hydraulic load is 200 m³ in an hour and in a period out of season it is 100 m³. Such a plant has also remarkable deviations of the substance load with maximum values in summer and winter. The average concentration of the pollution in season or out of season shows the following table I.

TABLE I

| sort of pollution | season | | out of season | |
|---|---|---|---|---|
| | inlet mg/l | outlet mg/l | inlet mg/l | outlet mg/l |
| $BOD_5$ | 488,0 | 6,3 | 116,0 | 2,6 |
| COD | 951,0 | 28,0 | 269,0 | 15,8 |
| SS | 606,0 | 17,0 | 165,0 | 9,0 |
| P tot | 7,0 | 0,53 | 2,6 | 0,35 |
| $N-NH_4^+$ | 36,0 | 3,90 | 8,9 | 0,48 |
| $N-NO_3$ | 0,17 | 9,50 | 0,3 | 7,0 |
| $N-NO_2$ | 0,01 | 0,05 | 0,03 | 0,03 |
| N org | 22,0 | 2,0 | 8,0 | 1,8 |
| N tot | 57,0 | 15,5 | 17,2 | 9,3 | where $BOD_5$ is biological oxygen demand in five days per one kilogramme of volatile suspended solids of the activated sludge COD is chemical oxygen demand SS suspended solids P tot total amount of phosphorus in the waste water N org amount of the organic bound nitrogen N tot total amount of nitrogen Example of the Method No. 2

The described method of the biological purification used for pig manure purification is in question. The pig sewage presents an example of extraordinarily polluted waste water having a concentration of organic substances, nitrogen and phosphorus, which exceeds the concentration of the communal waste waters in the order. Again the documentation of the results of the method according to the invention is in order.

The input values of the pig manure after a mechanical separation of the rough components show the table II.

TABLE II

| | amount in mg/l |
|---|---|
| COD | 24170 |
| $BOD_5$ | 7500 |
| SS | 9390 |
| $N-NH_4^+$ | 1060 |
| N tot | 1640 |
| P tot | 1970 |

A controlled system of aeration was used, namely gradually different intensity of the aeration in the circulation circle with the controlled time course of the aeration according to the invention. At the outlet following parameters of water mentioned in table III were achieved.

TABLE III

| | amount in mg/l |
|---|---|
| COD | 160 |
| $BOD_5$ | 20 |
| SS | 5 |
| $N-NH_4^+$ | 20 |
| N tot | 30 |
| P tot | 3 |

The embodiment according to FIG. 8 to 11 is a modular one, based on the basic module of the circulation circuit. An increase of the reactor capacity is obtained by adding other modules of the circulation circuit to the basic module.

The number of adjoint modules may vary and so it is possible to form a reactor in a modular way with a capacity responding to a need. A preferred solution is formed by a multi-unit arrangement of several adjoint modules without another partition between them, as shown in cross section in FIGS. 9,10.

Figure 8:
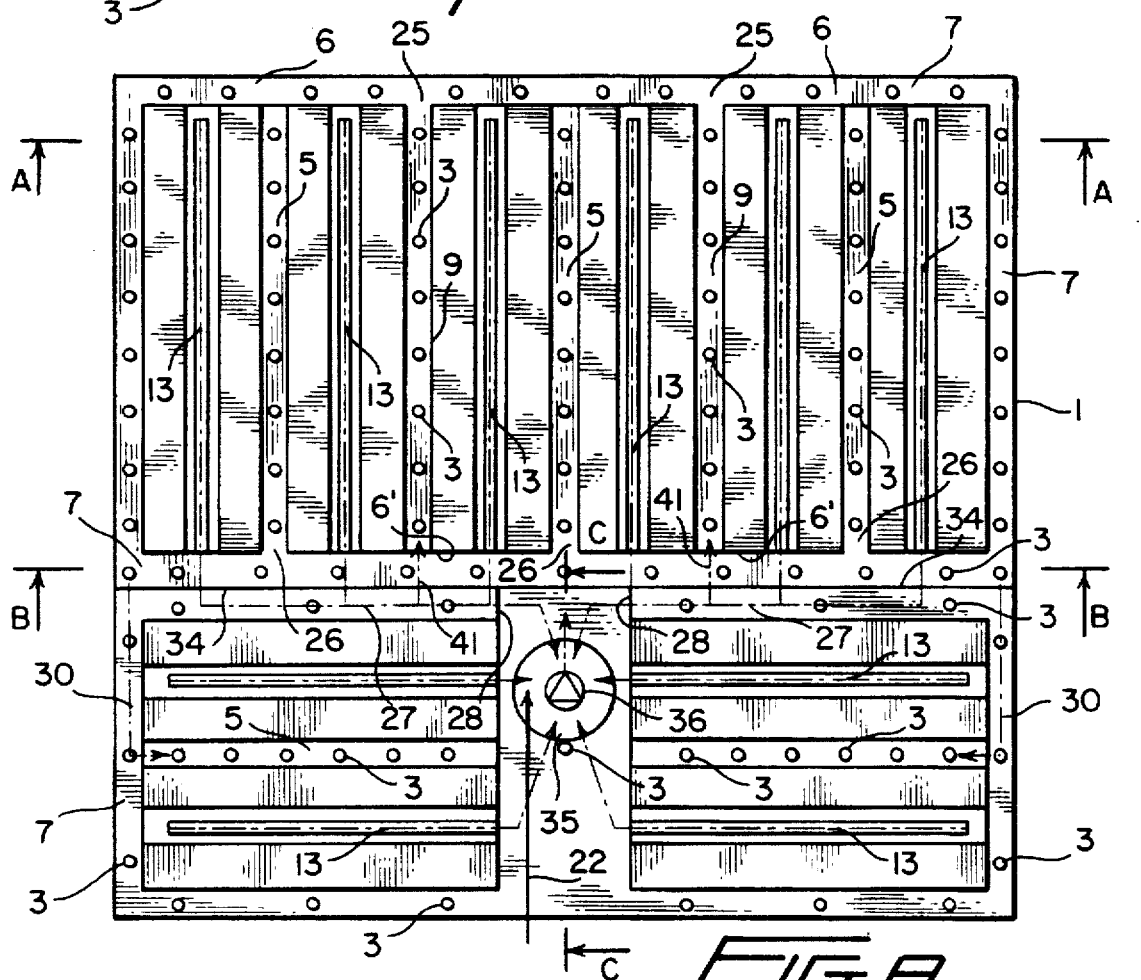
FIG. 8 is a top view at the reactor with a rectangular ground plan resulting from adjoining other modules of the circulation circuit to the basic module of the circulation circuit.

In that exemplifying embodiment right-angled tank having circumferential walls 1 is divided by a system of inserted partitions 2 into functional spaces for activation biological processes of waste water purification and for separation of flocculent suspension by a fluidized bed filter in the same way as in the basic module in the circulation circuit. What is different is that the separation spaces 4 divide the activation space in distribution channels 5 and new inlet flow channels 9, wherein the distribution channels 5 are the same as in the single basic module, while the inlet flow channel 9 is not present in the single basic module and it is formed essentially by two opposing circumferential flow channels 7 of the basic module. The distribution channels 5 and the inlet flow channels 9 are closed at one end by faces 6, which entirely close the separation spaces 4 and the distribution channels 5. Nevertheless, the faces 6 are interrupted at the end of the inlet flow channels 9, forming passages 25, by means of which the inlet flow channels 9 are connected with the circumferential flow channel 7 (FIG. 8). The passages 25 have got the same form as the passages of the basic module. The flow channels, e.g. the circumferential flow channel 7 and the inlet flow channel 9, are in all embodiments at their longitudinal sides entirely separated from the adjoining spaces, especially from the separation spaces 4.

The flow channels are designated as inlet flow channel 9 and circumferential flow channel 7 just to make the arrangement clear, because the circumferential channel 7 is arranged along the circumferential wall 1 of the tank and the activation mixture enters the inlet channel 9 before it enters the distribution channel 5. But the designation "flow" is more essential for both of said channels because both are intended for plug flow of the activation mixture, without permission the activation mixture to get away from these flow channels 7,9 and also without changing the flow volume in these serially connected channels.

The separation spaces 4 and the inlet flow channels 9 are at the other end quite closed by the face walls 6'. These face walls 6' are also interrupted and thus at the places of the interruption form the passages 26 in a similar way as in the above mentioned basic module, wherein the distribution channels 5 communicates through the passages 26 with the circumferential flow channel 7. The separation spaces 4 for fluidized bed filtration are connected with the distribution channels 5 in the same way as in the basic module. There are no circumferential walls between the adjoint modules of the circulation circuit—in the exemplifying embodiment of the reactor there are three modules—so that by adding two modules to each other the flow channel 9 arises, as mentioned above.

The module in the embodiment according to FIGS. 8 to 11 perpendicular to the adjoint modules is modified. Unlike the individual basic module according to FIGS. 1 to 5 this modified basic module has no passage 26 formed in the face wall 6', so that the distribution channels 5 are closed at both sides. So the distribution channel 5 of this modified basic module (FIG. 8) does not communicate with the circumferential flow channel 7 of the modified basic module. In addition the separation spaces 4 are divided into two parts, a collecting sump 35 being arranged between them. There are two baffle plates 28 used therefor (FIG. 8).

The modified basic module is separated from the adjoint modules system by a partition wall 34, wherein passages 41 indicated by arrows in FIG. 8 are formed. The passage 41 connects always the circumferential channel 7 of the modified basic module with the beginnings of the inlet flow channels 9 of the adjoint modules. The circumferential flow channel 7 of the adjoint modules is connected through the interconnection 30, for example through pipes, with the distribution channels 5 of the modified basic module (FIG. 8). The outlets 27 of the collecting mains 13 mouth in the collecting sump 35. It is also within the scope of present invention to form another modification of connections between the adjoint modules and perpendicular modified basic module.

The function of the reactor according to FIG. 8 to 11 is essentially identical with the function of the basic module in the circulation circuit described above. Raw waste water is brought into the collecting sump 35, wherefrom the waste water, mixed with thickened activation mixture, is discharged into the area between collecting sump 35 and the partition wall 34. It flows further towards the circumferential flow channel 7 of the modified basic module—in FIG. 8 below. It flows then in both sides through the circumferential flow channel 7 as far as to the partition wall 34 and through the passages 41 in said partition wall into the inlet flow channels 9 of the adjoint modules (FIG. 8), wherefrom it comes into the circumferential flow channel 7—as shown in FIG. 8 above. The activation mixture flows out of it further through the circumferential flow channels 7 along both sides of the tank. It advances further through the circumferential flow channel 7 along the modified basic module and enters the distribution channels 5 of the adjoint modules through the passages 26 and also the distribution channels 5 of the basic module through the interconnection 30—formed for example by pipes. The activation mixture comes from the distribution channels 5 into the separation spaces 4, as mentioned above. The thickened activation mixture from the separation spaces 4 is brought by the collecting equipment, especially by the collecting main 13 and outlets 27, into the collecting sump 35.

Another alternative of the apparatus according to the present invention (not shown) has a circular tank, wherein the flow channels 9,7, the distribution channels 5 and the separation spaces 4 are arranged similar to the embodiment shown in FIG. 8 with the difference that the length of the separation spaces 4 and the shape of the circumferential flow channels 7 are adapted to the tank shape. Said embodiment is suitable mostly for reconstructions of circular sedimentation basins common e.g. in already existing and used municipal waste water purification plants of the classical type, to increase their quality and quantity parameters. Through reconstruction of the circular sedimentation basins in the hitherto existing municipal waste water purification plants it is possible to keep the original raking bridge (not shown) and to use it to access the individual places of the reactor tank doing the operational control.

The function of the reactor is at the same time essentially identical with the function of the preceding exemplifying reactors described above, especially with that of the reactor according to FIG. 8 to 11.

Figure 12:
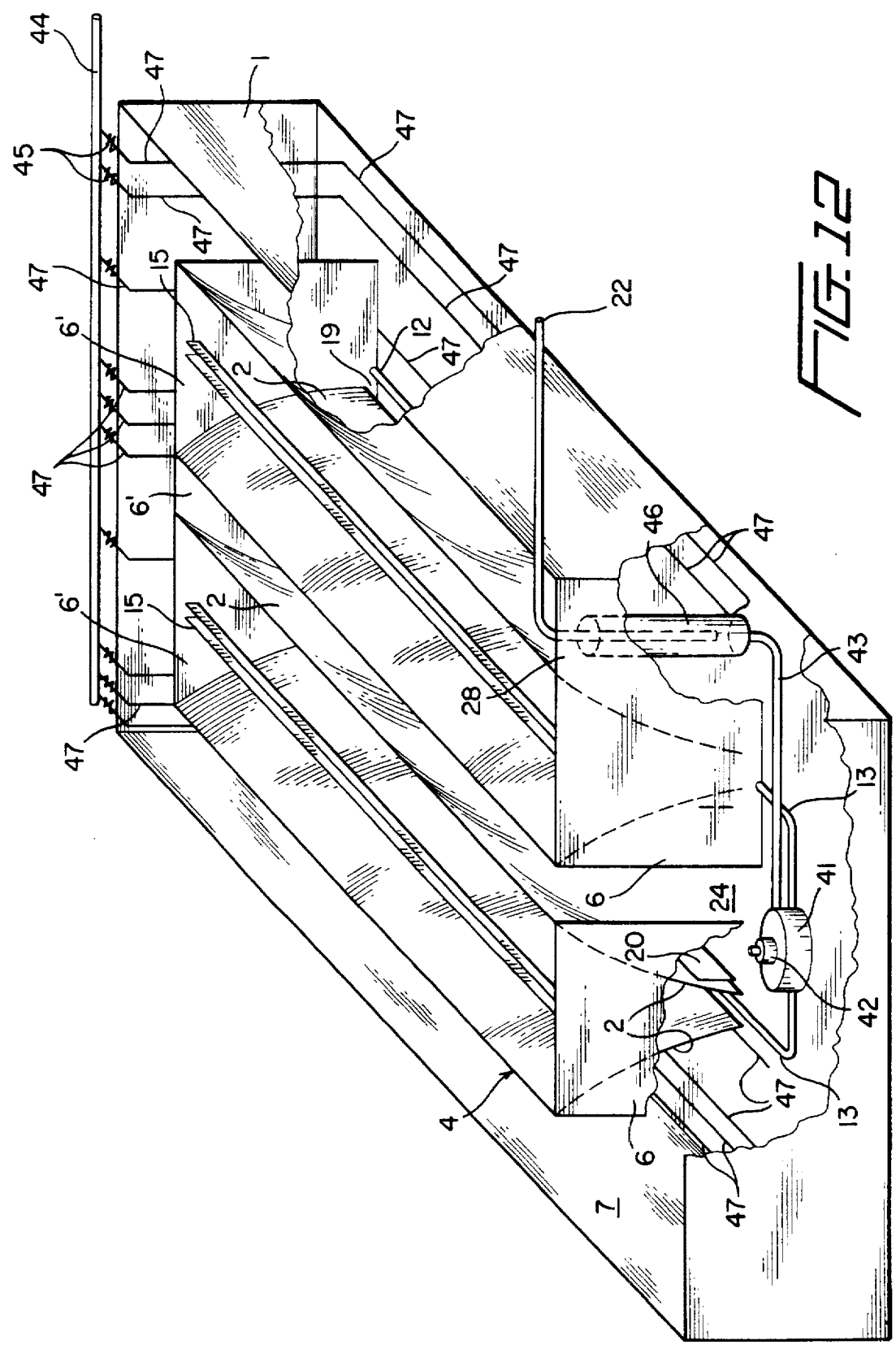
FIG. 12 is an oblique view at another embodiment of the reactor with partial cuts.
Figure 13:
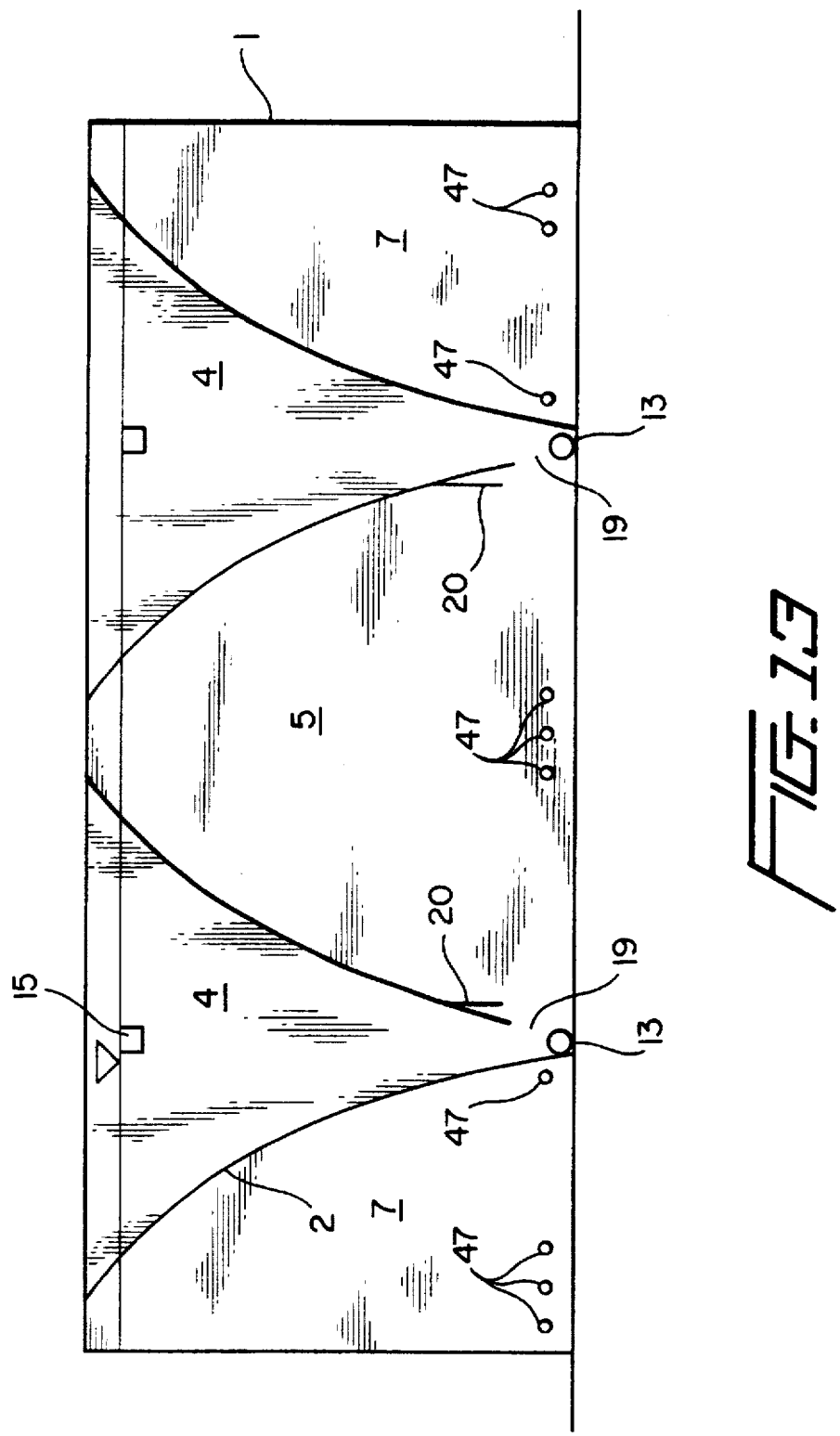
FIG. 13 is a schematical transversal crossection through the embodiment shown in FIG. 9.

Another variant of the apparatus according to the invention is shown in FIG. 12 and 13.

In the rectangular tank with the circumferential wall 1 are through inserted partitions 2 and face walls 6 and 6' created two longitudinal separation spaces 4, spreading out in the upwards direction. The partitions 2 are advantageously in their lower parts connected to the bottom of the tank and with their upper parts to a not shown carrier construction. Separation spaces 4 create in the tank between the partitions 2 and face walls 6,6' the distributing channel 5, which is a part of the activation space. The face wall 6 of the separation space 4 reaches up to the circumferential wall 1 and creates thus the partition wall 28, which similarly to the previous alternative separates the circumferential flow channel 7. The other face wall 6' closes not only separation spaces 4, but it separates also the distribution channel 5 from the circumferential flow channel 7. The circumferential flow channel 7' is a through flow channel, it does not communicate with any other space except of distributing channel 5, which is linked to it.

In the opposite face wall 6 an inlet 24 to the distribution channel 5 is created. The separation space 4 is along to its complete length connected with the distribution channel 5 and due to it also with the activation space through the only one passage 19, which is arranged in at least one breaking of the partition 2 at the bottom of the tank (FIG. 13). The passage 19 can be either along its length without break or it can be made as a set of orifices in the partition 2 of the separation space 4.

Partitions 2 have in the cross section advantageously an arc form (FIG. 12). The partitions 2 expand from each other in the upwards direction and they thus create the prismatic separation space 4 for the fluidized bed filter. The partitions 2 are at the same time at the bottom separated from each other and between them is at the bottom arranged the perforated collecting piping 13, which is mouthed to the pumping aggregate 25. The partition 2 can be made from a smooth material or from a profiled material. It is advantageous to make the profilation in the direction from above to bottom, what ensues in forming of low ribs on the surface of the partitions 2.

In the area of the passage 19 at least one flow rectifier 20 is added to the partitions 2 from the side of activation space, i.e. from the side of distribution channel 5. It is determined for the separation of the flow of activation mixture in the distribution channel 5 from the flow in separation space 4. The flow rectifier 20 is advantageously attached to the partition 2 and it is orientated vertically and it is extending substantially along the full length of partition 2. It is possible to arrange along the length of partition 2 a number of flow rectifiers 20 linking to each other. The flow rectifier 20 is arranged at the lower part of the partition 2, its lower edge being situated over the lower edge of partition 2, but it reaches at most to the level of edge of the partition 2. It is nevertheless also possible to leave this flow rectifier 20 out. When the flow rectifier 20 is applied, it restricts the transfer of turbulence from the activation space to the separation space. Its efficiency can be higher at the profiled partitions 2 or even at smooth separation walls, where the profilation is made only in the area of attachment of flow rectifier 20, where it is attached to the ribs of profile of partition 2 and thus does not abut tightly to the separation wall in the whole area of joint. In this way a small part of activation mixture between the flow rectifier 20 and partition 2 comes to the area of passage 19 and it supports the restriction of transfer of turbulence from the distribution channel 5 of the activation space.

The pumping aggregate 41 consists of the pump body, in which the collecting piping 13 is mouthed and which is attached to the bottom of the tank, and of a moving pump wheel which is connected through the shaft to an immersion electric motor, which is advantageously a reversible one. Rotating parts of the pumping aggregate 41 are mounted with the possibility of drawing them out above the level of the reactor during its operation.

Into the pumping aggregate 41 the collecting piping from the other separation space 4 is mouthed, pumping aggregate 41 being thus common. In case of great length of the separation spaces 4 the pumping aggregate can be advantageously placed in the middle of the length of the distribution channel 5. In that case are to the pumping aggregate from the both neighored separation spaces 4 mouthed four collecting pipings 13, always two and two from each side. At the great length of the reactor it is possible to arrange a number of pumping aggregates behind each other in order to reduce the length of the collecting piping 13 to 12 meters, what is the optimum length for the collecting system.

Power unit of the pumping aggregate 41 is the electric motor 42. On the not shown carrier construction an elevating mechanism (not shown) is placed. Reversible electric motor 42 and moving wheel of the pumping aggregate 41 are mounted slidingly on the guide stabs, which are arranged perpendicularly to the bottom of the tank. Due to this elevating mechanism it is possible to pull out the submerged reversible electric motor 42 and the moving wheel of the pumping aggregate 41 on these (not shown) guide stabs even without the emptying of the tank. Pumping aggregate 41 and its power unit are modified for the reversible moving for the reverse flow of the activation mixture in the collecting piping 13.

At the beginning of the distributing channel 5 and thus at the beginning of the activation space a mixer 46 for the mixing of activation mixture with the raw waste water is arranged. The outlet 43 from the pumping aggregate 41 is brought behind the partition wall 28 at the beginning of the circumferential channel 7 to the mixer 46, into which also the inlet 22 of the raw waste water is mouthed.

Mutual interconnection among the circumferential channel 7, distributing channel 5, separation space 4 and the collecting system, created by the collecting piping 13 and pumping aggregate 41, forms an inner circulation circuit. From the above described results that the collecting piping 13 could be specified also as a recirculation piping, because through it the activation mixture comes back to the circulation circuit.

The circumferential channel 7 and the distributing channel 5 are equipped with an aeration system consisting of the row of perforated elastic aeration hoses 47, connected to a common distribution system 44 of the pressed air. The (not shown) orifices in the perforated elastic aeration hoses 47 are advantageously small for the creation of smooth bubbles by the aeration. Every aeration hose 47 is equipped with an independent valve 45 or with a (not shown) regulator for the regulation of the aeration intensity. Through location of various numbers of the aeration hoses 47 in different places of the circumferential channel 7 and the distributing channel 5, the aeration intensity according to the needs of purification process can be influenced. Another regulation of the aeration intensity in dependence on the time can be achieved by installation of a (not shown) blower with a changeable speed of rotation or by installing of bigger number of blowers and by starting them according to the needs of aeration. At an advantageous arrangement of the aeration hoses 47 in the activation space the aeration hoses 47 are located in two branches, each of them can contain several aeration hoses 47. These branches are arranges mutually at the opposite sides of the cross-section of the circumferential channel 7, regularly near at the bottom of the tank.

The upper part of the separation space 4 is equipped by the overflow channels 15 for the removal of cleared water after fluidized bed filtration.

The described alternative according to the FIGS. 12 and 13 works analogically with the previous alternatives.

The subject is an integrated reactor for biological waste water purification, wherein separation spaces 4 for the separation of suspension of the activated sludge by fluidized bed filtration are built-in in the activation space. By building-in of separation spaces 4 a system of channels is created, said channels being interconnected serially behind each other by the above described manner.

The raw waste water is brought through the inlet piping to the mixer 46 at the beginning of the circumferential channel 7 in the direction of the flow behind the partition wall 28, where the pumping aggregate 41 also brings the recirculated activation mixture from the separation spaces 4 by. In the mixer 46 the raw waste water is perfectly mixed with the recirculated activation mixture. The bringing-in of the organic substances present in the raw waste water to the activation mixture induces an intermittent decline of the content of the dissolved oxygen, whereby at the beginning of circumferential channel 7 anoxid conditions for the denitrification processes are created.

Suspendation of the activated sludge is in this anoxid part of the activation kept by the aeration with a very low intensity, which is satisfactory for keeping suspension in suspendation, but anoxid conditions for a process of denitrification are not disturbed. Because of this the number aeration hoses 47 in this part of the circumferential channel 7 is reduced. For improving of the suspendation it is possible to equip this part of the circumferential channel 7 by a not shown mechanical source of mixing, which eventually enables complete leaving out of aeration from this part of activation.

The course of the denitrification process is checked by measuring of parameters of the activation mixture by using of probes (not shown), which bring the impulses to the power units of the blowers. In such a way their speed of rotation and amount of supplied air is being changed. By the reduced intensity of aeration is the denitrification zone in the circumferential channel 4 spread out, whereby the intensity of denitrification arises. This process can be fully automated.

During a plug flow of the activation mixture through the circumferential channel 7 the content of dissolved oxygen is gradually enhanced, this process being a consequence of the enhanced intensity of aeration and of the decline of content of biodegradationable substances. In such a way an oxide milieu for the aerobe activation processes of the biodegradation of organic substances and for nitrification of ammoniacal and organic nitrogen is created. If the aeration hoses 47 are arranged in two branches located at the opposite sides of the cross-section of the circumferential channel 7, it is possible by means of the valves 45 or not shown regulators to bring the air alternatively into one branch and then into the other branch. During bringing the air for example into the left branch a transverse circulating movement of the activation mixture originates. At interrupting the bringing of the air into the left branch and bringing the air into the right branch a counter-flow of the air and the activation mixture originates. The activation mixture due to the inertia continues its hitherto existing transverse circulating movement up to the moment, when its movement by action of the flowing air is stopped and it begins to turn into the opposite sense. These operating cycles may be regularly repeated by means of the regulation. Thus the time of the keeping of the air in the activation mixture is extended, by which the oxygen transition into the activation mixture is increased. Another effect of the counter-flow of the air and the activation mixture is more effective suspendation of the activated sludge.

In the distribution channel 5 before the intake to the separation space 4 the intensity of aeration can be arranged so that the content of dissolved oxygen coming to the layer of the fluidized bed filter in the separation space 4 fully ensures oxyd conditions in the course of the whole separation process.

A short time of the activation mixture in the separation space during the fluidized bed filtration, what is the consequence of the small volume in which the separation take place, contributes to the optimum oxide conditions during the separation by the fluidized bed filtration as well. It is a result of the prismatic form of the separation space 4 and of the high filtration speed in the fluidized bed filter.

The described course of the activation biological waste water purification with the changing of the oxide and anoxide conditions in the circulation circuit causes the accumulation of phosphorus from the waste water in activated sludge. During the following separation of the excess activated sludge in the separation space the strict oxide conditions prevents the reverse release of the accumulated phosphorus back to the purified water. In such a way a high efficiency of the biological purification process, even where the removal of the phosphorus from the waste water is concerned, could be achieved. The clear water is taken away after its passage through the fluidized bed filter to the removal channels 15.

As it was described, the separation space 4 is connected to the distributing channel 5 only through one passage 19, at which one or more rectifier(s) 20 of the flow is (are) arranged. This simple solution of the inlet of the activation mixture to the separation space 4 is enabled by an intensive recirculation of the activation mixture in the circulation circuit with its removal at the bottom of the separation space 4 by the collecting piping 13. The intensity of circulation of activation mixture in the circulating circuit influences at the same time the efficiency of denitrification processes according to the formula mentioned in the first alternative.

From the bottom of the separation space 4 the activated sludge separated in the separation space 4 during the process of filtration in the fluidized bed is sucked off, and together with the circulating activation mixture from the activation distributing channel 5, i.e. from the activation process. The intensity of the flow in the lower part of the separation space 4 in consequence of the recirculation of the activation mixture prevents a transfer of perturbations from the aerated distributing channel 5 to the separation space 4. By this means the stability of the fluidized bed filter in the separation space 4 and a high separation efficiency are secured.

The restriction of the interconnection between the activation space and the separation space to an only passage 19 at the bottom of the tank significantly simplifies the construction of the separation space 4. It enables to use self-carrying shell structure for construction of the separation space 4, which consists of only two elements, namely two separation walls 3. These walls are attached directly at the bottom of the tank and with its other upper end to a not shown supporting structure.

The system of connecting of more collecting pipings 13 to one pumping aggregate 41, eventually the installation of more pumping aggregates 41 enables keeping of the optimum length of the collecting piping 13 for big capacities of the waste water purification plants as well, the length of the separation space of which could reach up to several hundreds of meters.

The reversible course of the pumping aggregate is used to the purify the collecting piping by a reverse stream of water.

INDUSTRIAL APPLICABILITY

The method and apparatus according to the present invention is suitable both for new waste water purification plants construction and for reconstruction of hitherto existing classical waste water purification plants with individual activation and sedimentation tanks, especially for big capacity plants.

Present invention may consequently be used for a relatively simple reconstruction of said existing waste water purification plants reaching herewith a considerable intensification, namely through increasing their capacity and their purification efficiency, including phosphorus and nitrogen removal.

We claim:

1. A method for biological activation waste water purification comprising
pumping activated sludge into a circulation circuit, said circulation circuit comprising a flow channel and at least one distribution channel,
adding raw waste water to said activated sludge in said circulation circuit to form an activation mixture,
gradually denitrifying said activation mixture as it flows through said circulation circuit,
flowing said denitrifying activation mixture through said circulation circuit as a plug flow of said activation mixture;
aerating said activation mixture to suspend said activated sludge in said activation mixture while gradually saturating said activation mixture with oxygen so as to gradually change the denitrifying of said activation mixture to the nitrifying of said activation mixture as said mixture flows through said circulation circuit, flowing said activation mixture into a fluidized bed filter to separate said activation mixture into purified water and activated sludge, removing said purified water from said circulation circuit, optionally removing a portion of said activated sludge from said circulation circuit, pumping said activated sludge into said circulation circuit, and continuing said process.

2. The method according to claim 1
wherein the quantity of said purified water removed from said circulation circuit is less than the quantity of said activation mixture circulating in said circulation circuit.

3. The method according to claim 1
wherein the amount of dissolved oxygen in said activation mixture saturated with oxygen is 2 mg of oxygen per one liter of activation mixture.

4. The method according to claim 1
wherein the aerating of said activation mixture intensifies as said activation mixture flows through at least said flow channel of said circulation circuit.

5. The method according to claim 1
wherein the circulation intensity of said activation mixture in said circulation circuit is at least double the circulation intensity of said purified water removed from said circulation circuit.

6. The method according to claim 5
wherein the circulation intensity of said activation mixture is from 2 to 6 times that of said purified water.

7. An apparatus for biological activation waste water purification comprising a tank comprising side walls, end walls and a bottom surface, at least one basic module positioned on the bottom surface of said tank and spaced from said side walls and end walls of said tank and defining a flow channel about said module;

said basic module comprising outside side walls, an end wall and a pair of spaced face walls defining the other end of said module, a pair of partitions within said module, each of said partitions extending from one of said face walls to said end wall of said module and defining a pair of separation spaces with the side walls of said basic module, said pair of partitions defining a distribution channel therebetween, said distribution channel communicating with said flow channel at the opening between said spaced face walls, each of said partitions having at least one opening therein communicating with said separation space and said distribution channel, aeration members located in said tank between said basic module and said end walls and side walls of said tank, and between said pair of partitions, a baffle plate extending from one of said side walls of said tank to said basic module, and collecting means for collecting activated sludge.

8. The apparatus for biological activation waste water purification as defined in claim 7, further comprising means for conducting at least a portion of said thickened activation mixture into said flow channel, an admission means for adding raw waste water into said flow channel, means for removing activated sludge from said separation space, and a second collecting means for collecting purified water in said separation space, said flow channel and said distribution channel defining a circulation circuit.

9. The apparatus as defined in claim 7
wherein said collecting means is proximate said bottom surface of said tank, at least one of said partitions having a smaller upper opening proximate a larger lower opening for communicating between said distribution channel and said separation space and forming a dropping resistance against said activation mixture flowing from said distribution channel into said at least one separation space.

10. The apparatus as defined in claim 7
wherein said at least one opening in each of said partitions communicates with said separation space and said distribution channel and extends longitudinally along said partitions proximate said bottom surface of said tank.

11. The apparatus as defined in claim 7
wherein said collecting means including at least one collecting main is in said separation space proximate said bottom surface of said tank, said collecting main having inlets for receiving said activated sludge.

12. The apparatus as defined in claim 11
wherein said collecting means further comprises a pump communicating with said collecting main for removing activated sludge from said separation space.

13. The apparatus as defined in claim 7, further comprising two or more of said basic modules positioned on said bottom of said tank and spaced from said side walls and end walls of said tank.

14. The apparatus as defined in claim 13
wherein said collecting means includes a sump for receiving activated sludge from said collecting main.

15. The apparatus as defined in claim 14
including means communicating with said sump and introducing raw waste water into said sump.

16. The apparatus as defined in claim 13
wherein at least one of said basic modules is perpendicular to at least another one of said basic modules within said tank.

17. The apparatus as defined in claim 13
wherein said basic modules are arranged perpendicularly and symmetrically about an axis through the center of said tank.

18. The apparatus as defined in claim 17
wherein at least one of said basic modules is parallel to at least one other basic module to form a system of basic modules which is symmetrical about an axis through the center of said tank.

19. The apparatus as defined in claim 7
wherein a portion of said aeration members proximate said baffle plate have spacing therebetween which is greater than spacing between said aeration members which are further downstream from said baffle plate.

20. The apparatus as defined in claim 7
wherein each of said separation spaces provides a pair of inlet openings having a cross sectional area of flow through each of said pair of inlet openings which is greater than 10% of the top surface area of each of said separation spaces.

21. The apparatus as defined in claim 7 wherein said collecting means comprises a centrifugal pump located within a sump.

22. The apparatus as defined in claim 7 wherein at least one of said openings in said partitions extends along the length of said partitions, wherein said collecting means includes a collecting main extending along said separation space.

23. The apparatus as defined in claim 7 wherein each of said partitions comprises a vertical member and a tapered member spaced from said vertical member along the length of said partitions.

24. The apparatus as defined in claim 23 wherein each of said side walls of said basic module and each of said partitions form a pair of Y-shaped separation spaces.

25. The apparatus as defined in claim 7 wherein each of said partitions defines a plurality of openings.

26. The apparatus as defined in claim 7 further comprising at least one trap in said separation space for collecting floated sludge.

27. The apparatus as defined in claim 26 wherein said at least one trap for floated sludge extends the length of said separation space, said trap sloping from one end of said separation space to the other end of said separation space, whereby the floated sludge collected in said trap exits from the separation space and into the flow channel.

28. The apparatus as defined in claim 11 further comprising at least one flow deflector extending from at least one of said partitions, proximate said opening in said partition, and located on the side of said partition proximate said other partition.

29. The apparatus as defined in claim 7 further comprising a mixer proximate said baffle plate and having a first and second inlet and an outlet, wherein said raw waste water from said admissions means enters said first inlet, wherein said activated sludge from said pump enters said second inlet, and whereby said raw waste water and said activation mixture are mixed in said mixer and exit through said outlet into the beginning of said flow channel proximate said baffle plate.

30. The apparatus as defined in claim 12 wherein said collecting means further comprises a submersible reversing electric motor for driving said pump.

31. The apparatus as defined in claim 30 further comprising
guiding bars extending from the bottom of said tank bottom,
said pump having a runner,
said submersible reversing electric motor and said runner slidably mounted on said guiding bars.

32. The apparatus as defined in claim 30 wherein said pump is connected with at least two collecting mains.

33. The apparatus as defined in claim 11 further comprising
an air pressure supply,
a plurality of aeration means in said flow channel and said distribution channel and in communication with said air pressure supply, for aerating said activation mixture.

34. The apparatus as defined in claim 33 wherein said aeration means comprise aeration hoses having a plurality of spaced openings therein for passage of the air therethrough,
said aeration hoses extending along the bottom of said tank.

35. An apparatus for biological activation waste water purification comprising
a tank comprising side walls, end walls and a bottom surface,
a modified module positioned on the bottom surface of said tank and spaced from said side walls and end walls of said tank and defining a circumferential flow channel about said module,
said modified module comprising a first side wall, a second side wall, and end walls defining a separation space therein,
said first side wall and one of said side walls of said tank defining a distribution channel therebetween, said distribution channel comprising one length of said circumferential flow channel and communicating with said circumferential flow channel at one end of said first side wall,
said first side wall having at least one opening therein communicating with said separation space and said distribution channel,
aeration means located in said tank between said modified module and said end walls and side walls of said tank,
a baffle plate extending from one of said side walls of said tank to said modified module, and
collecting means for collecting activated sludge from said separation space.

* * * * *